United States Patent [19]
Riew

[11] 3,867,321
[45] Feb. 18, 1975

[54] PRODUCTION OF EPIHALOHYDRIN POLYMER LATEX

[75] Inventor: Changkiu K. Riew, Akron, Ohio

[73] Assignee: The B. F. Goodrich Company, New York, N.Y.

[22] Filed: Mar. 18, 1974

[21] Appl. No.: 451,927

[52] U.S. Cl............. 260/17.4 ST, 260/17.4 SG, 260/29.2 EP, 260/29.6 NR, 260/29.6 WQ, 260/29.7 EM, 260/33.6 A
[51] Int. Cl............................................ C08g 51/24
[58] Field of Search.......... 260/29.2 EP, 29.7 EM, 260/17.4 SG, 17.4 ST

[56] References Cited
UNITED STATES PATENTS

| | | | |
|---|---|---|---|
| 3,341,475 | 9/1967 | Vandenberg | 260/29.2 EP |
| 3,402,218 | 9/1968 | Wilson | 260/29.2 EP |
| 3,446,769 | 5/1969 | Opipari | 260/31.4 |
| 3,485,773 | 12/1969 | Hershelman | 260/29.2 EP |
| 3,686,111 | 8/1972 | Makhlouf et al. | 260/31.2 |

FOREIGN PATENTS OR APPLICATIONS

| | | | |
|---|---|---|---|
| 6,500,056 | 1/1965 | Netherlands | 260/29.7 EM |

Primary Examiner—Murray Tillman
Assistant Examiner—Arthur H. Koeckert
Attorney, Agent, or Firm—J. Hughes Powell, Jr.

[57] ABSTRACT

Latex is prepared from epihalohydrin homopolymers or copolymers by (1) mixing polymer and at least one solvent to form a cement, (2) reducing cement viscosity by the addition thereto of at least one polymer nonsolvent, (3) forming a water-in-cement emulsion, (4) inverting emulsion (3) to a cement-in-water emulsion, (5) removing solvent and nonsolvent, and (6) optionally, concentrating the latter emulsion to a high solids latex by removing water.

7 Claims, No Drawings

PRODUCTION OF EPIHALOHYDRIN POLYMER LATEX

BACKGROUND OF THE INVENTION

Many synthetic polymers may be produced by solution polymerization. The prior art recognizes that polymer content of solutions is an economic compromise, i.e., too dilute a solution for ease of handling requires removal of an uneconomical amount of solvent, and too concentrated a solution is too viscous for easy handling. Prior art methods for converting polymer solutions to latices, such as the methods taught by U.S. Pat. Nos. 3,250,737 and 3,261,792, have generally been adequate for most synthetic rubber solutions.

Epihalohydrin polymer solutions are particularly difficult to emulsify, since they exhibit high solution viscosities even at low polymer concentrations. Epihalohydrin homopolymer solution viscosities must be overcome by large mixing energy inputs and/or use of impractical amounts of water and emulsifier in a direct emulsification, i.e., formation of a cement-in-water emulsion in a single step. Moreover, particle size increases slowly to an undesirable level during emulsification of a homopolymer solution. Epihalohydrin copolymer solutions described hereinafter cannot be emulsified directly. A new method of producing epihalohydrin homopolymer and copolymer latices is desired which overcomes these prior art disadvantages.

SUMMARY OF THE INVENTION

Latex is prepared from epihalohydrin homopolymers or copolymers by (1) mixing polymer and at least one solvent to form a cement, (2) reducing cement viscosity by the addition thereto of at least one polymer nonsolvent, (3) forming a water-in-cement emulsion, (4) inverting emulsion (3) to a cement-in-water emulsion, and (5) removing solvent and nonsolvent.

DETAILED DESCRIPTION

Epihalohydrin homopolymers or epihalohydrin copolymers containing at least one other epoxide copolymerized therewith are used in the process of this invention. Epihalohydrin homopolymers are prepared readily by polymerizing at least one epihalohydrin selected from the group consisting of epichlorohydrin, epibromohydrin, epiiodohydrin, or epifluorohydrin and mixtures thereof, more preferably epichlorohydrin. Epihalohydrin homopolymers suitable for use in this invention and their manufacture are described in U.S. Pat. No. 3,158,580.

Epihalohydrin copolymers are prepared by polymerizing at least one epihalohydrin described heretofore together with at least one other epoxide having the formula

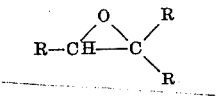

wherein all R radicals are selected from the group consisting of hydrogen, alkyl, and alkenyl radicals containing 1 to 10 carbon atoms, more preferably 1 to 5 carbon atoms, alkoxyalkyl radicals containing 2 to 10 carbon atoms more preferably 2 to 6 carbon atoms, phenoxyalkyl radicals wherein the alkyl group contains 1 to 6 carbon atoms, and phenyl radicals, and at least one of said R radicals is hydrogen. Even more preferably all R radicals are selected from the group consisting of hydrogen and alkyl radicals containing 1 to 3 carbon atoms, and at least one of said R radicals is hydrogen. Examples of suitable epoxides include alkylene oxides such as ethylene oxide, propylene oxide, cis- and trans-but preferably cisbutene-2-oxide, butene-1-epoxide, cis- and trans-pentene-2-oxide, cis- and trans-hexene-2-oxide, cis- and trans-hexene-3-oxide, and the like; phenyl akylene oxides such as styrene oxide and the like; and glycidyl ethers such as methyl glycidyl ether, ethyl glycidyl ether, methylethyl glycidyl ether, butyl glycidyl ether, phenyl glycidyl ether, and the like. Excellent results were obtained with ethylene oxide and propylene oxide. Suitable epihalohydrin copolymers and their manufacture are described in U.S. Pat. No. 3,158,581.

The epihalohydrin homopolymers and copolymers used in the process of this invention form a thick cement in a polymer solvent comprising at least one aromatic hydrocarbon of the formula

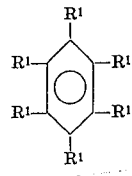

wherein $R^1$ is hydrogen or an alkyl radical containing 1 to 3 carbon atoms and at least two $R^1$'s are hydrogen, such as benzene, toluene, xylene, mesitylene, and the like. More preferably $R^1$ is hydrogen or an alkyl radical containing 1 to 2 carbon atoms and at least three $R^1$'s are hydrogen. The cement viscosity is reduced to allow use of a reasonably high polymer concentration in the process of this invention. This reduction is achieved by use of at least one polymer nonsolvent. The nonsolvent is selected from the group consisting of alkanes and cycloalkanes containing from 5 to 10 carbon atoms, more preferably from 5 to 8 carbon atoms, such as pentane, hexane, heptane, cyclohexane, and the like; aliphatic and cycloaliphatic ketones containing from 3 to 10 carbon atoms, more preferably from 3 to 6 carbon atoms, such as acetone, acetylacetone, 2,5-pentanedione, and the like; aliphatic and cycloaliphatic ethers containing from 3 to 10 carbon atoms, more preferably from 3 to 6 carbon atoms, such as tetrahydrofuran, diethyl ether and the like; aliphatic and cycloaliphatic alcohols containing from 1 to 10 carbon atoms, more preferably from 1 to 6 carbon atoms, such as methanol, ethanol, propanol, and the like; and chlorinated aliphatic hydrocarbons containing from 1 to 10 carbon atoms, more preferably from 1 to 6 carbon atoms, such as chloroform, carbon tetrachloride, 1,2-dichloroethylene, trichloroethylene, tetrachloroethylene, and the like.

From about 2 to about 25 parts by weight of nonsolvent is used per 100 parts by weight of total solvent and nonsolvent, more preferably from about 2 to about 15 parts by weight of nonsolvent per 100 parts by weight of total solvent and nonsolvent. From about 1 to about 30 parts by weight of polymer is used per 100 parts by weight of total polymer, solvent and nonsolvent, more preferably from about 5 to about 20 parts by weight of polymer per 100 parts by weight of total polymer, solvent and nonsolvent. The viscosity of the cement (polymer and solvent) which can be used practically within the scope of this invention is from about 500 centipoises to about 200,000 centipoises as measured using a Brookfield viscometer, more preferably from about 500 to about 100,000 centipoises.

Emulsifiers suitable for use in this invention include anionic, cationic and nonionic types or any practical combination thereof. Satisfactory emulsifiers are described in Becher, *Emulsions: Theory and Practice* (Reinhold Publishing Corporation, New York, 1965). Other useful emulsifiers are listed in *McCutcheon's Detergents and Emulsifiers* (1973 North American Edition, Allured Publishing Corporation, New Jersey, 1973).

Examples of anionic emulsifiers include (1) potassium, sodium and ammonium salts of fatty acids containing from 4 to 22 carbon atoms, more preferably from 10 to 22 carbon atoms, such as potassium, sodium and ammonium salts of rosin acids, oleic acid, palmitic and stearic acid, lauric acid, myristic acid, arachidic acid, castor acids and the like; (2) potassium, sodium and ammonium salts of fatty sulfated alcohols containing from 4 to 22 carbon atoms, more preferably from 10 to 22 carbon atoms, such as sodium oleyl sulfate, sodium lauryl sulfate and the like; and (3) alkyl aromatic sulfonates containing from 1 to 22 alkyl carbon atoms and a benzene or naphthalene aromatic nucleus, such as sodium dodecyl benzene sulfonate, sodium cumene sulfonate, sodium toluene sulfonate and the like.

Examples of cationic emulsifiers include the amine salts, such as octadecylamine hydrochloride and the like and the quaternary ammonium salts, such as cetyl trimethyl ammonium bromide, N-stearyl dimethylbenzyl ammonium chloride, and the like. Examples of nonionic emulsifiers include compounds having the formula

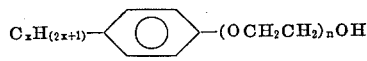

wherein x and n are at least 1, such as octylphenoxyethanol, nonylphenoxyethanol and the like; reaction products of fatty acids with polyhydric alcohols, including monoglycerides such as glyceryl monostearate and the like; and amides of alkylol amines such as lauroyl diethanolamide and the like.

The amount of emulsifier used in the process of this invention is from about 0.5 to about 15 parts by weight per 100 parts by weight of epihalohydrin polymer, more preferably from about 1 to about 5 parts by weight per 100 parts by weight of epihalohydrin polymer. Use of more than about 15 parts of emulsifier may cause excessive foaming in subsequent mixing and/or concentration steps. Sufficient water is used to form an emulsifier solution to give a final emulsifier solution/polymer weight ratio after inversion of from about 10:1 to about 1:5, more preferably from about 4:1 to about 1:2. Thickening agents are particularly useful together with the anionic, cationic and nonionic emulsifiers described heretofore and improve final latex stability. From about 0.01 to about 0.5 part of at least one thickening agent may be used per 100 parts of epihalohydrin polymer. A thickening agent, if used, is preferably mixed with the emulsifier solution.

Anionic thickening agents are described in U.S. Pat. No. 2,798,053. Such an agent comprises an alkali metal or ammonium salt of a copolymer of (1) a monomeric olefinically unsaturated carboxylic acid containing at least one carboxyl group and containing at least one activated carbon-to-carbon olefinic double bond in the alpha-beta position with respect to a carboxyl group thusly:

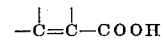

or as a part of a terminal methylene grouping thusly:

$$CH = C< \; ;$$

and (2) a polyalkenyl polyether of a polyhydric alcohol, which polyhydric alcohol contains at least 4 carbon atoms to which are attached at least 3 hydroxyl groups, the polyether containing more than one alkenyl ether group per molecule; and (3) optionally, other monoolefinic monomeric materials.

Preferred carboxylic monomers for use in the anionic thickening agent are the monoolefinic acrylic acids having the formula $$CH_2=\overset{R^2}{\underset{|}{C}}-COOH$$

wherein $R^2$ is selected from the group consisting of hydrogen, halogen, hydroxyl, lactone, lactam and the cyanogen (—C≡N) groups, monovalent alkyl radicals, monovalent aryl radicals, monovalent aralkyl radicals, monovalent alkaryl radicals, and monovalent cycloaliphatic radicals, more preferably hydrogen and alkyl radicals containing 1 to 2 carbon atoms. Examples of preferred carboxylic monomers include acrylic acid, methacrylic acid, ethacrylic acid, chloroacrylic acid, bromoacrylic acid, cyanoacrylic acid, α-phenylacrylic acid, α-benzylacrylic acid, α-cyclohexylacrylic acid and the like. Acrylic acid is most preferred.

A preferred class of polyhydric alcohols for use in the production of the polyalkenyl polyether monomer are the oligosaccharides, defined as containing from one to four monosaccharide units. The reduction products of the oligosaccharides and other sugars may also be used, such as the alcohols, keto-alcohols and aldo-alcohols and their oxidation products which retain the original saccharide chain such as the sugar acids, the aldo-acids and the like. Examples of oligosaccharides include monosaccharides such as glucose, galactose, fructose, sorbose, rhamnose and the like; disaccharides such as sucrose, arabinose, maltose, lactose and the like; trisaccharides such as raffinose and the like; and others. Sucrose is much preferred.

"Sugar alcohols" are useful as polyhydric alcohols in the thickening agent, such as erythritol, xylitol, mono-, di- and tri-pentaerythritol, arabitol, mannitol, iditol, tolitol, sorbitol, inositol, dulcitol and the like. Pentaerythritol is much preferred.

A preferred anionic thickening agent comprises an alkali metal or ammonium salt of a copolymer of (1) from about 90 to about 99.9 percent by weight of a monomeric monoolefinic acrylic acid having the formula $$CH_2=\overset{R^3}{\underset{|}{C}}-COOH$$

wherein $R^3$ is selected from hydrogen and alkyl radicals containing 1 to 2 carbon atoms, and (2) from about 0.1 percent to about 10 percent by weight of a polyether of a polyol selected from the group consisting of oligosaccharides, reduced derivatives thereof in which the carbonyl group is converted to an alcohol group, and pentaerythritol, the hydroxyl groups of said polyol which are modified being etherified with allyl groups, said polyol having at least two allyl ether groups per polyol molecule.

An even more preferred anionic thickening agent comprises an alkali metal or ammonium salt of a copolymer of (1) from about 96 to about 99.9 percent by weight of acrylic acid and (2) from about 0.1 to about 4 percent by weight of a polyether of a polyol selected from the group consisting of sucrose and pentaerythritol, the hydroxyl groups of said polyol which are modified being etherified with allyl groups, said polyol having at least two allyl ether groups per polyol molecule.

Suitable cationic thickening agents comprise crosslinked, quaternized, polyepihalohydrin polymers prepared by the reaction of (a) a polyepihalohydrin homo- or copolymer, (b) from about 0.0005 to about 0.07 mole of an aliphatic, heterocyclic, aromatic, or alicyclic polyamine, and (c) from about 1 mole to about 5 moles of an aliphatic, heterocyclic, aromatic or alicyclic tertiary monoamine, said moles of polyamine and tertiary monoamine based upon one mole equivalent of halogen present on the polyepihalohydrin polymer. Suitable nonionic thickening agents include natural gums such as gum tragacanth, gum arabic and the like; and synthetic polymers such as polyacrylamide, polyethylene oxide and the like.

The process comprises these steps: (1) mixing an epihalohydrin homopolymer or copolymer and at least one solvent to form a cement, (2) reducing cement viscosity by the addition thereto of at least one polymer nonsolvent; (3) forming a water-in-cement emulsion; (4) inverting emulsion (3) to a cement-in-water emulsion; (5) removing solvent and nonsolvent; and (6) optionally, concentrating the latter emulsion to a high-solids latex by removing water. If necessary, the latex may be filtered to remove coagulum. From about 10 to about 50 percent by weight, more preferably from about 20 to about 35 percent by weight, of the total emulsifier solution described heretofore is used in the step (3) formation of a water-in-cement emulsion. From about 50 to about 90 percent by weight, more preferably from about 65 to about 80 percent by weight, of the total emulsifier solution is used in the step (4) inversion to a cement-in-water emulsion. There is no required addition order in step (3) or step (4), although it is preferred that emulsifier solution be added to the cement in step (3), and that the water-in-cement emulsion be added to emulsifier solution in step (4).

Latices are obtained when the solvent and nonsolvent are removed from the emulsion in step (5) by methods known to those skilled in the art, such as by evaporation under reduced pressure using a Rinco evaporator or the like. The latices may be concentrated to high solids content in step (6) by methods known to the art such as by centrifuging, by water evaporation, by addition of a creaming agent such as ammonium alginate and the like.

The inversion portion of this process permits use of less water and less emulsifier than required for direct emulsification and results in less foaming and more practical latex recovery times and costs. The use of a solvent/nonsolvent system allows production of polymer cement having much higher total solids content than equally viscous cements using a solvent system. Higher total solids content in turn permits more copolymer to be emulsified in steps (3) and (4) using less solvent, less water and less emulsifier and consequently results in fewer recovery and foaming problems in later steps. An additional unexpected feature of this invention is the production of a smaller average particle size latex (less than 1 micron to 6 microns).

A preferred embodiment of this invention comprises adding fresh cement to a latex prepared by the process of this invention. Steps (2), (3), (4) and (5) above are thereafter repeated. This fresh cement addition and repetition of steps (2), (3), (4) and (5) may be done one or more times to prepare latices with particle size ranges following a bimodal distribution curve or even a more multi-peaked distribution curve. Alternatively, this repetitive batch process may be performed in a continuous process by methods known to the art.

Use of a higher viscosity cement, e.g., from about 50,000 to about 200,000 centipoises, as measured using a Brookfield viscometer, may make it necessary to cool the system during inversion to a cement-in-water emulsion to avoid excessive shear heating and thereby to avoid formation of excessive coagulum. This cooling is to less than 50°C and preferably to less than 30°C.

Many types of mixing apparatus may be used in the process of this invention. For example, simple mixers may be used, including turbine stirrers such as the Eppenback Homomixer as well as propeller mixers. Colloid mills may be used, such as the Tri-Homo colloid mill and the like. Either a single-or double-stage homogenizer may be used, such as those produced by the Manton-Gaulin Manufacturing Co. Ultrasonic emulsators are less commonly used but are also suitable, such as a Rapisonic mixer and the like. When an Eppenback Homo-mixer is used for emulsification, it is beneficial to emulsify at lower initial Homo-mixer speeds. The final mixing is then carried out at full speed. When emulsification is started at higher speed, the liquid polymer or cement may not enter the rotor blades of the Homo-mixer.

An illustration of the viscosity reduction achieved by use of a solvent/nonsolvent system in place of a solvent system was shown by dissolving an epichlorohydrin-/ethylene oxide copolymer in a solvent and then mixing the cement with a nonsolvent. About 10 percent by weight of copolymer was used per 100 parts by weight of total polymer, solvent and nonsolvent. The copolymer had an epichlorohydrin content of about 67.7 percent by weight of polymer, a Mooney viscosity of about 100 (ML + 4 212°F), a specific gravity of about 1.27, and a molecular weight of about one million. The mixing apparatus used was an Eppenbach Homo-mixer turbine stirrer. Mixer speed was monitored by a stroboscope and was a maximum of 7,900 ± 100 rpm. Brookfield viscosities were measured at room temperature using a Brookfield Viscometer, Type LVT, with spindle No. 4 3 rpm. Data is summarized in Table I.

TABLE I

| Solvent | Nonsolvent | Solvent (wt.%) | Nonsolvent (wt.%) | Copolymer (wt.%) | Brookfield Viscosity (CPS) |
|---|---|---|---|---|---|
| Benzene | — | 90 | 0 | 10 | 40,000 |
| Benzene | Acetone | 84 | 6 | 10 | 14,200 |
| Benzene | Methanol | 88 | 2 | 10 | 23,600 |

TABLE I-Continued

| Solvent | Nonsolvent | Solvent (wt.%) | Nonsolvent (wt.%) | Copolymer (wt.%) | Brookfield Viscosity (CPS) |
|---|---|---|---|---|---|
| Benzene | Ethanol | 72 | 18 | 10 | 19,000 |
| Benzene | Tetrahydrofuran | 86 | 4 | 10 | 19,400 |
| Benzene | Cyclohexane | 62 | 14 | 10 | 17,600 |
| Benzene | 2,5-pentane dione | 88 | 23 | 10 | 20,600 |

To make a typical stable high solids latex using the process of this invention, an epichlorohydrin/ethylene oxide copolymer was used having an epichlorohydrin content of about 67.7 percent by weight of polymer, a Mooney viscosity of about 100 (ML + 4 212°F), a specific gravity of about 1.27 and a molecular weight of about one million. The mixing apparatus used was an Eppenbach Homo-mixer turbine stirrer. Mixer speed was monitored by a stroboscope and was a maximum of 7,900 ± 100 rpm. Brookfield viscosities were measured at room temperature using a Brookfield Viscometer, Type LVT, with spindle No. 4 3 rpm. The copolymer was dissolved in benzene to form a cement and the cement was then mixed with acetone. The mixture had the following composition:

| | | |
|---|---|---|
| Copolymer | 200 g. | (1) |
| Benzene Solvent | 744 g. | (2) |
| Acetone Nonsolvent | 56 g. | (3) |
| Total | 1,000 g. | |

The emulsifier solution had the following composition:

| | | |
|---|---|---|
| Sodium Lauryl Sulfate | 6 g. | (4) |
| Ammonium Salt of Copolymer of about 99.5% Acrylic Acid and about 0.5% Allyl Pentaerythritol | 0.1 g. | (5) |
| Distilled Water | 800.0 g. | (6) |

(1) 20 parts copolymer per 100 parts total copolymer, solvent and nonsolvent
(2) 93 parts benzene per 100 parts solvent/nonsolvent mixture
(3) 7 parts acetone per 100 parts solvent/nonsolvent mixture.
(4) 3 parts anionic emulsifier per 100 parts copolymer.
(5) 0.05 parts anionic thickening agent per 100 parts copolymer.
(6) Sufficient water is used to form the emulsifier solution to give a final emulsifier solution/copolymer weight ratio after inversion of about 4:1.

About 300 grams (37 percent) of the emulsifier solution was placed in a half-gallon stainless steel beaker. The beaker was cooled externally with an ice-bath. All the cement was added to the emulsifier solution during a 3-minute time period while the Eppenbach mixer was run at about 6500 – 7000 rpm. The mixer was then run for an additional 5 minutes at maximum speed (≈ 7900 ± 100 rpm). Even though the beaker was cooled externally the emulsion temperature rose to about 45°C during mixing. The emulsion was cooled thereafter to room temperature.

The smooth mayonnaise-like water-in-cement emulsion was added to the rest of the emulsifier solution (63 percent of the total initial amount) in another stainless steel beaker. The Eppenbach mixer speed was gradually increased over a 6-minute period from 5,000 to 8,000 rpm. Temperature was maintained at 20 ± 1°C by external cooling. Mixing at high speed was continued for 9 more minutes. Inversion occurred during the 15 minute time period. The cement-in-water emulsion then was sampled.

The sample was freed substantially of solvent by evaporation in a Rinco evaporator at 30°C and 25 ± 1 in.Hg. pressure. The solvent-free latex was filtered successively through 200, 230 and 400 mesh sieves to remove any coagulum or cream. Stability of the latex sample was judged by determination of sedimentation (measurement of total solids content of a top layer of a latex, which was not moved or shaken at any time during the test period). The total solids content was found to be about 19.5 percent initially and about 14.2 percent after about 5½ months. These results indicate the latex had excellent stability.

The latices produced by the process of this invention have many uses known to those skilled in the art, such as in paints, coatings, adhesives, paper treatment, and the like.

I claim:

1. A process of preparing a latex from an epihalohydrin homopolymer or copolymer, said homopolymer being a polymer of at least one epihalohydrin selected from the group consisting of epichlorohydrin, epibromohydrin, epiiodohydrin, epifluorohydrin and mixtures thereof and said copolymer containing at least one of said epihalohydrins and at least one other epoxide having the formula

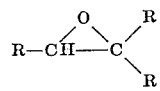

where all R radicals are selected from the group consisting of hydrogen, alkyl and alkenyl radicals containing 1 to 5 carbon atoms, alkoxyalkyl radicals containing 2 to 6 carbon atoms, phenoxyalkyl radicals wherein the alkyl group contains 1 to 6 carbon atoms, and phenyl radicals, but at least one of said R radicals is hydrogen, wherein said process comprises 1. mixing said epihalohydrin homopolymer or copolymer and at least one solvent to form a cement having a viscosity from about 500 centipoises to about 200,000 centipoises, said solvent comprising at least one aromatic hydrocarbon of the formula

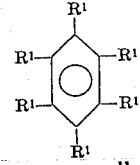

where $R^1$ is hydrogen or an alkyl radical containing 1 to 3 carbon atoms and at least two $R^1$s are hydrogen, 2. reducing cement viscosity by the addition thereto of at least one polymer nonsolvent, said nonsolvent being selected from the group consisting of alkanes and cycloalkanes containing from 5 to 10 carbon atoms, aliphatic and cycloaliphatic ketones containing from 3 to 10 carbon atoms, aliphatic and cycloaliphatic ethers containing from 3 to 10 carbon atoms, aliphatic and cycloaliphatic alcohols containing from 1 to 10 carbon atoms, and chlorinated aliphatic hydrocarbons containing from 1 to 10 carbon atoms, and wherein about 2 to about 25 parts by weight of said nonsolvent is used per 100 parts by weight of total solvent and nonsolvent, and from about 1 to about 30 parts by weight of polymer is used per 100 parts by weight of total polymer, solvent and nonsolvent, 3. forming a water-in-cement emulsion, and 4. inverting emulsion (3) to a cement-in-water emulsion, wherein suitable emulsifiers are anionic, cationic and nonionic types or any practical combination thereof in an amount from about 0.5 to about 15 parts by weight per 100 parts by weight of polymer, sufficient water is used to form an emulsifier solution to give a final emulsifier solution/polymer weight ratio after inversion of from about 10:1 to about 1:5, from about 10 percent to about 50 percent by weight of said emulsifier solution is used in said step (3) formation of a water-in-cement emulsion, and from about 50 to about 90 percent by weight of said emulsifier solution is used in said step (4) inversion to a cement-in-water emulsion, and 5. removing said solvent and nonsolvent.

2. A process of claim 1 wherein said $R^1$ radical is hydrogen or an alkyl radical containing 1 to 2 carbon atoms and at least three $R^1$'s are hydrogen, said nonsolvent is selected from the group consisting of alkanes and cycloalkanes containing from 5 to 8 carbon atoms, aliphatic and cycloaliphatic ketones containing from 3 to 6 carbon atoms, aliphatic and cycloaliphatic ethers containing from 3 to 6 carbon atoms, aliphatic and cycloaliphatic alcohols containing from 1 to 6 carbon atoms, and chlorinated aliphatic hydrocarbons containing from 1 to 6 carbon atoms, from about 2 to about 15 parts by weight of said nonsolvent is used per 100 parts by weight of total solvent and nonsolvent, from about 5 to about 20 parts by weight of polymer is used per 100 parts by weight of total polymer, solvent and nonsolvent, said emulsifiers are used in an amount from about 1 to about 5 parts by weight per 100 parts by weight of polymer, said final emulsifier solution/polymer weight ratio after inversion is from about 4:1 to about 1:2, from about 20 to about 35 percent by weight of said emulsifier solution is used in said step (3) formation of a water-in-cement emulsion, and from about 65 to about 80 percent by weight of said emulsifier solution is used in said step (4) inversion to a cement-in-water emulsion.

3. A process of claim 2 wherein said epihalohydrin is epichlorohydrin and said other epoxide is selected from the group consisting of ethylene oxide and propylene oxide.

4. A process of claim 3 wherein there is used together with said emulsifier from about 0.01 to about 0.5 part of at least one thickening agent per 100 parts of said polymer, said thickening agent being selected from the group consisting of anionic, cationic and nonionic thickening agents, 1. said anionic thickening agent comprising at least one alkali metal salt or ammonium salt of a copolymer of (a) a monomeric olefinically-unsaturated carboxylic acid containing at least one carboxyl group and containing at least one activated carbon-to-carbon olefinic double bond in the α- position with respect to a carboxyl group or as a part of a terminal methylene group and (b) a polyalkenyl polyether of a polyhydric alcohol, said polyhydric alcohol containing at least 4 carbon atoms to which are attached at least 3 hydroxyl groups, the polyether containing more than one alkenyl ether group per molecule, 2. said cationic thickening agent comprising crosslinked, quaternized polyepihalohydrin polymers prepared by the reaction of (a) a polyepihalohydrin homo- or copolymer (b) from about 0.0005 to about 0.07 mole of an aliphatic, heterocyclic, aromatic, or alicyclic polyamine, and (c) from about 1 mole to about 5 moles of an aliphatic heterocyclic, aromatic or alicyclic tertiary monoamine, said moles of polyamine and tertiary monoamine based upon one mole equivalent of halogen present on the polyepihalohydrin polymer; and 3. said nonionic thickening agent is selected from the group consisting of polyacrylamide, polyethylene oxide and natural gums.

5. A process of claim 4 wherein said anionic thickening agent comprises an alkali metal or ammonium salt of a copolymer of (1) from about 90 to about 99.9 percent by weight of a monomeric monoolefinic acrylic acid having the formula

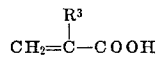

wherein $R^3$ is selected from hydrogen and alkyl radicals containing 1 to 2 carbon atoms, and (2) from about 0.1 to about 10 percent by weight of a polyether of a polyol selected from the group consisting of oligosaccharides, reduced derivatives thereof in which the carbonyl group is converted to an alcohol group, and pentaerythritol, the hydroxyl groups of said polyol which are modified being etherized with allyl groups, said polyol having at least two allyl ether groups per polyol molecule.

6. A process of claim 5 wherein said anionic thickening agent comprises an alkali metal or ammonium salt of a copolymer of (1) from about 96 to about 99.9 percent by weight of acrylic acid and (2) from about 0.1 to about 4 percent by weight of a polyether of a polyol selected from the group consisting of sucrose and pentaerythritol, the hydroxyl groups of said polyol which are modified being etherified with allyl groups, said polyol having at least two allyl ether groups per polyol molecule.

7. A process of claim 6 wherein said solvent is benzene, said nonsolvent is acetone, said anionic emulsifier is sodium lauryl sulfate, and said anionic thickening comprises an ammonium salt of a copolymer of about 99.5 percent acrylic acid and about 0.5 percent allyl pentaerythritol.

* * * * *